United States Patent [19]

Soltis

[11] Patent Number: 4,867,466
[45] Date of Patent: Sep. 19, 1989

[54] DISTANCE BASED METHOD AND APPARATUS FOR DETERMINING THE CENTER POSITION OF A VEHICULAR STEERING SYSTEM

[75] Inventor: Michael W. Soltis, Dearborn, Mich.

[73] Assignee: Ford Motor Company, Dearborn, Mich.

[21] Appl. No.: 133,987

[22] Filed: Dec. 16, 1987

[51] Int. Cl.⁴ ............................................. B62D 6/00
[52] U.S. Cl. ....................................... 280/94; 180/141
[58] Field of Search .................. 280/94, 707, 771; 180/79, 132, 141, 142

[56] References Cited

U.S. PATENT DOCUMENTS

| 3,608,925 | 9/1971 | Murphy | 280/112 |
| 3,895,816 | 7/1975 | Takahashi et al. | 280/6 H |
| 4,313,529 | 2/1982 | Kato et al. | 180/299 |
| 4,345,661 | 8/1982 | Nishikawa | 180/141 |
| 4,392,540 | 7/1983 | Michio et al. | 180/142 |
| 4,555,126 | 11/1985 | Ishimitsu et al. | 280/707 |
| 4,564,214 | 1/1986 | Tokunaga et al. | 280/707 |
| 4,621,833 | 11/1986 | Soltis | 280/707 |
| 4,722,545 | 2/1988 | Gretz et al. | 180/79 |

Primary Examiner—Kenneth R. Rice
Attorney, Agent, or Firm—Jerome R. Drouillard; Roger L. May

[57] ABSTRACT

An apparatus for determining the center position of a steering system installed in a vehicle uses a distance based algorithm to correct the center position. The actual steering position is sampled periodically, based upon the distance traveled by the vehicle, and corrections are made according to the difference between the sampled positions and a previously assumed steering center.

26 Claims, 4 Drawing Sheets

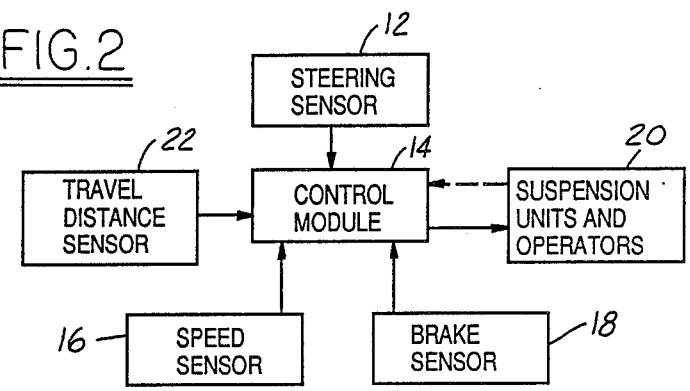
FIG.2
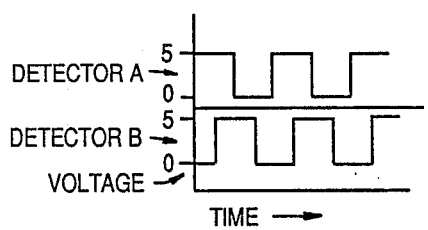
FIG.6A
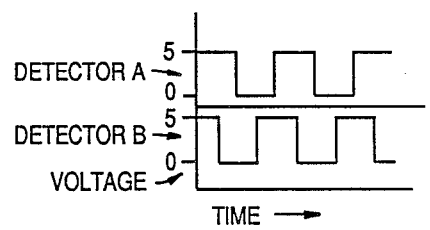
FIG.6B
|  | DETECTOR A | DETECTOR B |  |
|---|---|---|---|
|  | 0 | 0 |  |
|  | 1 | 0 |  |
| COUNTER-CLOCKWISE ROTATION | 1 | 1 | CLOCKWISE ROTATION |
|  | 0 | 1 |  |
|  | 0 | 0 |  |
|  | 1 | 0 |  |
FIG.7

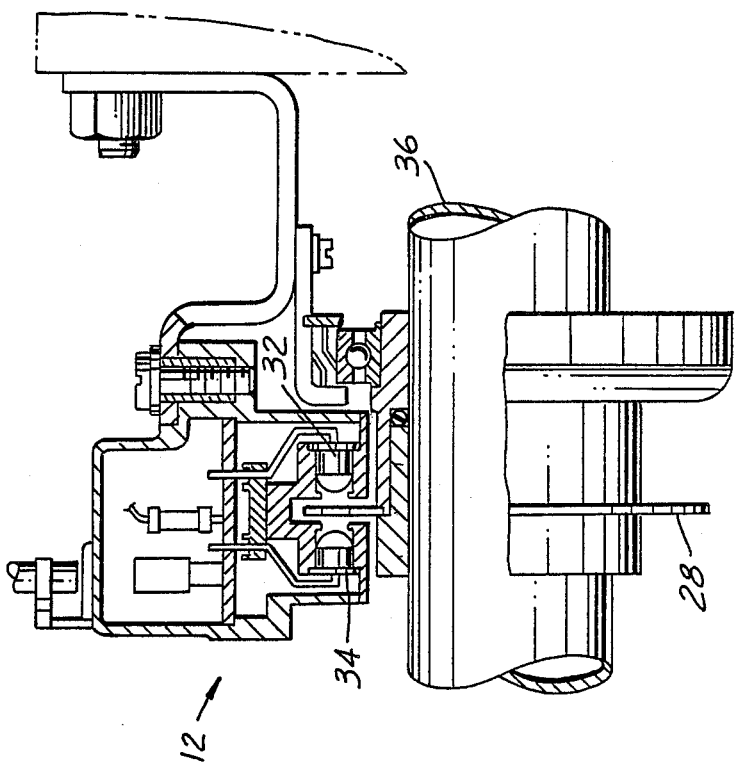
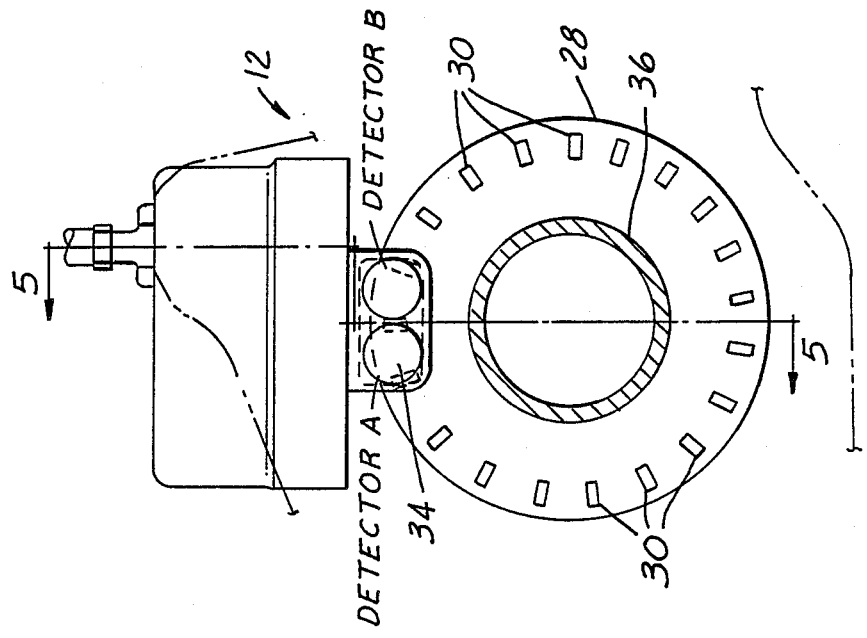

DISTANCE BASED METHOD AND APPARATUS FOR DETERMINING THE CENTER POSITION OF A VEHICULAR STEERING SYSTEM

BACKGROUND OF THE INVENTION

This invention relates to a distance based method and apparatus for determining the center position of a vehicular steering system. This method and apparatus are useful for controlling a vehicular suspension system.

DISCLOSURE INFORMATION

Adaptive automotive suspension systems are known in the art. An example of such a system is shown in U.S. Pat. No. 4,621,833, which is assigned to the assignee of the present invention, and which is incorporated by reference herein. The system of the '833 patent, as well as other known adjustable suspension systems, typically adjust the damping force produced by one or more suspension units according to a plurality of inputs from different sources within the vehicle. For example, it is known from the '833 patent to control suspension units by utilizing vehicle linear acceleration, braking, steering activity, vehicle speed, predicted lateral acceleration, and other inputs.

U.S. Pat. Nos. 3,608,925, 4,345,661, 4,555,126, and 4,564,214 illustrate the use of steering inputs for the control of suspension units. A related type of control is disclosed is U.S. Pat. No. 3,895,816 in which a centrifugal force sensor is operatively associated with valving to bias the vehicle so as to prevent excessive body roll during cornering. Systems employing fixed steering angle sensors are prone to failure due to misadjustment o f the sensor inasmuch as precise angular measurements must be obtainable from such sensors if they are to be employed in systems capable of correcting or anticipating and preventing excessive roll of an automobile body during a cornering maneuver. A related problem affects systems employing centrifugal force sensors inasmuch as such force cannot be sensed until it exists, and once such force has come into existence the vehicle's body will typically have assumed an attitude which can be corrected only by an active suspension device capable of exerting force independently of its velocity of operation. Thus, to be effective, a device for providing input to a control system for operating this suspension unit should anticipate lateral acceleration rather than merely sense acceleration. U.S. Pat. No. 4,621,833 discloses a steering center algorithm and method for finding steering center which is suitable for use in a system capable of anticipating lateral acceleration rather than merely sensing such acceleration.

The steering sensor system disclosed in U.S. Pat. No. 4,621,833 employs a software program in which steering center position is determined through the use of a fixed sample time detection scheme operating with variably sized circumferential window zones of operation of a steering shaft. Because the sampling time associated with the algorithm of U.S. Pat. No. 4,621,833 is fixed, the system disclosed therein has a limited capacity to deal with changes in steering center position.

The steering sensor system disclosed in allowed U.S. Pat. Application No. 046,005, which was filed on May, 4, 1987, and which is assigned to the assignee of the present invention, utilizes a software program in which steering center position is determined according to a variable sampling time strategy which may also employ a variable steering window concept.

All of the previously described systems and methods for determining the center position of a vehicular steering system suffer from a common drawback inasmuch as such systems all use the passage of either fixed or variable increments of time as the trigger for deciding when to sample and to correct the true center position of the steering system.

The use of time as the basis for triggering the correction of steering center position may cause inaccuracies in common driving situations. For example, if a vehicle is driven in a parking lot during the first few moments when a period of operation is begun, a time based system for determining the center steering position will take data and make corrections based upon the position of the steering wheel and steering system when the vehicle is in a succession of turns. This may cause the steering system to erroneously determine that the steering system is in the straight ahead position, when in fact, the road wheels are in a turning position. Similarly, when a vehicle is operated on the road the mere fact that corners are frequently negotiated at speeds which are lower than the speeds at which straight sections of road are traversed will in certain cases cause a misleading weighting of the steering correction data in favor of an off-center steering position.

In an effort to obviate problems caused by data taken during parking lot maneuvers, some center finding systems use a delay which prevents the implementation of any corrections to the steering center position unless or until the vehicle has moved at a given speed for a given period of time. Unfortunately, this attenuation does not ease the problem caused by turning during normal operation and may effectively prevent the system from responding to situations wherein it is desirable to receive an input from the steering system, such as during high speed maneuvering during the period prior to when the system "wakes up".

A method and apparatus according to the present invention solves the previously discussed problems with time based steering center finding systems by tracking distance traveled by the vehicle and by using such distance, rather than time, for determining when the difference between the actual steering system position and the calculated center position should be measured. Because the steering center position is adjusted at distance intervals, rather than at time intervals, the amount of relatively inferior data taken during parking lot and cornering maneuvers will be minimized for the simple reason that vehicles generally travel much smaller distances in parking lots and around corners, as compared to the distances traveled on straight or relatively straight roads.

It is an object of the present invention to provide a method and apparatus for dynamically determining the center position of a vehicular steering system.

It is yet another object of the present invention to provide a method and apparatus for determining the center position of a vehicular steering system which will rapidly determine a correct steering center position and will rapidly be able to revise a previously determined center position.

It is an advantage of the present invention that relatively fewer corrections of the steering center position will be made during vehicle operating conditions which are such as to produce unreliable data. As a result, the present system allows high confidence in the determined center position.

SUMMARY OF THE DISCLOSURE

In accordance with the present invention, an apparatus for determining the center position of a steering system installed in a vehicle, comprises steering sensor means for defining a movable center region of operation of the steering system and for detecting the operational position of the steering system with respect to the center region, distance sensor means for tracking the distance traveled by the vehicle, and processor means operatively connected with the steering and distance sensor means for adjusting the position of the center region of operation.

The processor means adjusts the position of said center region of operation by directing said steering sensor means to measure the difference between the position of the steering system and said center region and by moving the position of said center region by an amount which is based upon the magnitude of such difference. These adjustments preferably occur at predetermined intervals of distance sensed by said distance sensor.

In a preferred embodiment, the processor means adjusts the magnitude of the predetermined intervals of distance based upon the magnitude of the measured difference between the position of the steering system and the center region.

The center region of operation may comprise a window with a discrete center therein. Preferably, the processor adjusts the position of the window by directing said steering sensor means to measure the difference between the position of the steering system and the discrete center and by moving the position of the window by an amount which is based upon the magnitude of such difference.

The processor may be programmed so as to adjust the position of the window whenever said steering system is operated outside of the window, such that the discrete center is made coincident with the instantaneous operating position of the steering system.

A method for determining the center position of a vehicular steering system according with the present invention comprises the steps of: assuming an initial center position; recording the window distance during which the steering system has remained within a window of operation extending about the assumed center position; comparing the accumulated window distance to a variable sampling distance; measuring the difference between a steering system position characteristic value and the assumed center position whenever the window distance bears a predetermined relationship to the sampling distance; adjusting the assumed center position according to the measured difference between the steering system position characteristic value and the assumed center position; adjusting the sampling distance according to the measured difference between the steering system position characteristic value and the adjusted center position; and repeating each of the above steps sequentially with an adjusted center position substituted for the assumed center position. The counted window distance may be set equal to zero whenever the steering system is operated outside of the window of operation extending about the assumed center position as well as whenever the window distance is equal to the sampling distance. The window of operation preferably comprises an angular region of operation of a rotatable steering shaft with the angular region having a predetermined size. The window of operation is relocated whenever the rotatable steering shaft is operated outside of the window so that the relocated window extends on either side of the instantaneous position of the steering shaft. The window of operation may comprise an angular region of operation for rotatable steering shaft with the angular region being of variable size where the size of the window bears a predetermined relationship to the sampling distance. The size of the window is preferably decreased as the sampling distance is increased. In any event, each of the steps of determining the center position is repeated sequentially until the sampling distance reaches a predetermined value. The difference between the steering system position characteristic value and the assumed center position is measured preferably whenever window distance is equal to the sampling distance. Sampling distance is preferably increased when the measured difference between the steering system position characteristic value and the adjusted steering position is less than a predetermined value. Sampling distance is preferably decreased when the measured difference between the steering system position characteristic value and the adjusted center position is greater than the predetermined value. The steering system position characteristic value may comprise the instantaneous steering system position, or it may comprise a distance-averaged steering system position, or it may comprise the center of the window of operation of the steering system.

An alternative method according to the present invention includes the steps of assuming a discrete center position, defining a window extending about the discrete center position, recording the excursion distance in which the steering system is operated outside the window during a predetermined vehicle travel distance, and adjusting the discrete center position according to the magnitude of the recorded excursion distance.

BRIEF DESCRIPTION OF THE DRAWINGS

FIG. 2 is an overall system block diagram in accordance with an embodiment of this invention.

FIG. 4 is a plan view, partially cut away, of a steering sensor comprising a component part of a center finding system according to the present invention.

FIG. 5 is a cross sectional view of the steering sensor of the present invention taken along the line 5—5 of FIG. 4.

FIG. 6A illustrates the output wave forms of the detectors employed in the steering sensor illustrated in FIGS. 4 and 5 for clockwise rotation.

FIG. 6B illustrates the output wave forms of the detectors employed in the steering sensor illustrated in FIGS. 4 and 5 for counterclockwise rotation.

FIG. 7 is a truth table illustrating the outputs of detectors A and B illustrated in FIGS. 4-6 as the steering sensor of the present invention is rotated counterclockwise and clockwise.

DESCRIPTION OF THE PREFERRED EMBODIMENTS

Figure 1:
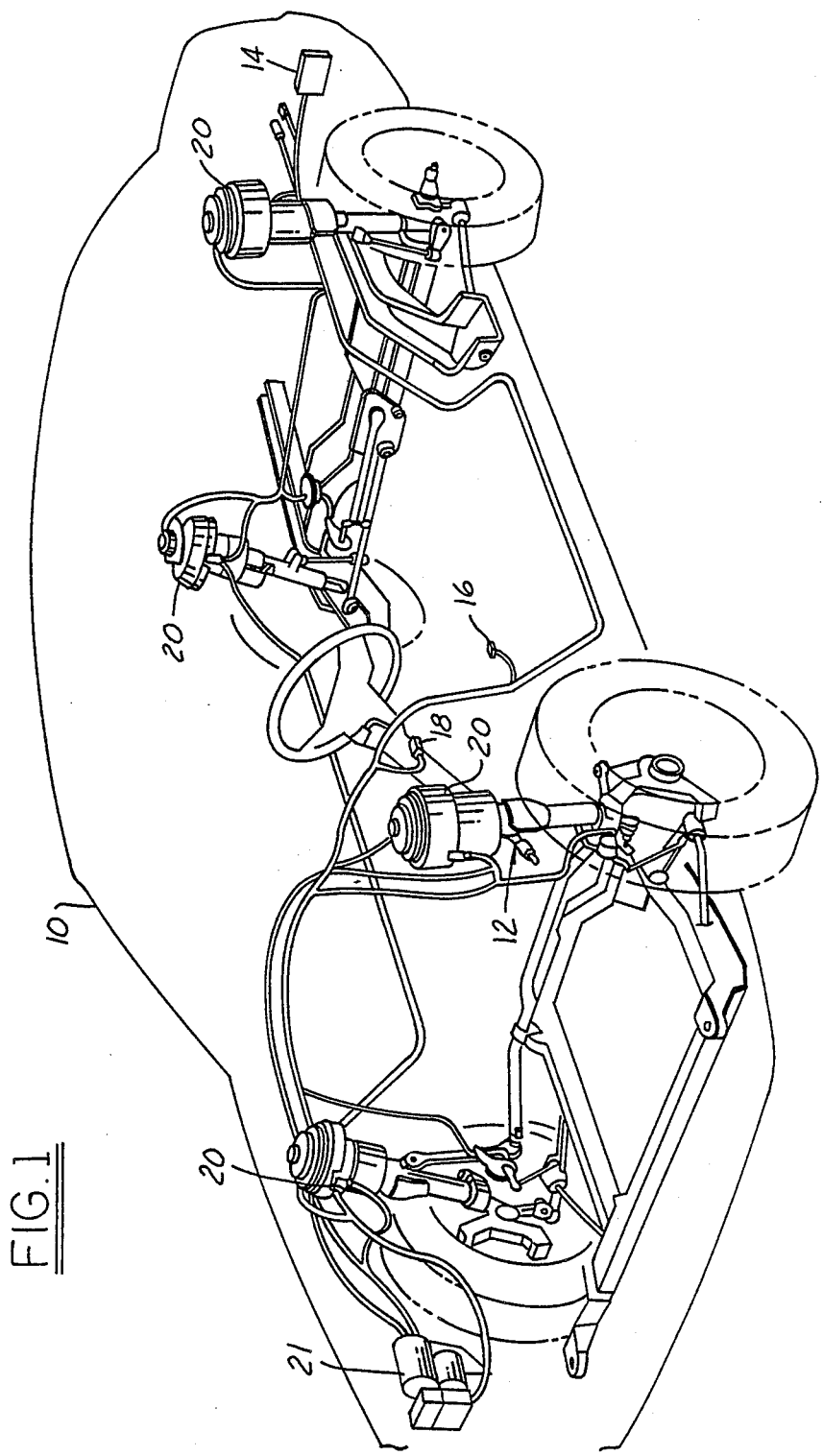
FIG. 1 is a perspective drawing of a motor vehicle the present invention. This figure shows various components of a system embodying the present invention.

As shown in FIG. 1, the method and apparatus of the present invention is intended for use with adjustable suspension units typically found in automotive vehicles.

The motor vehicle shown in FIG. 1 is equipped with adjustable front and rear suspension units 20. These suspension units are preferably constructed in a known matter such as that disclosed in U.S. Pat. No. 4,313,529, which discloses means for constructing a strut or shock absorber which is adjustable by a rotary valve positioned within one of the passageways running through the piston of the shock absorber or strut. The rotary valve functions to vary the effective cross sectional area of the passageway, thus providing an adjustable damping force. Those skilled in the art will appreciate in view of this disclosure that a system according to the present invention could be utilized to control not only adjustable suspension units and steering gears, but also other types of adjustable vehicular devices such as hydraulic crossover suspension systems, variable volume air suspension springs, or variable stabilizer bars.

The component parts of a system according to the present invention are shown in FIGS. 1 and 2. Accordingly, control module 14 receives inputs from steering sensor 12, speed sensor 16, brake sensor 18, and travel distance sensor 22. Although the suspension units are illustrated as being of the variable volume air spring type operating with compressed air supplied by compressor 21, a system according to the present invention could, as previously noted, be used with other types of suspension units or other automotive equipment with which it is necessary to know the position of the steering system.

Those skilled in the art will appreciate in view of this disclosure that speed sensor 16 and travel distance sensor 22 could comprise any of a variety of devices or systems employed in automotive vehicles. It has been determined, for example, that a combined vehicle speed and distance sensor used with current model Ford Motor Company vehicles, comprising a variable reluctance alternating current generator driven by a vehicle powertrain component such as transmission, and which transmits a signal every 0.000125 miles, is useful for practicing the present invention.

Because the present system utilizes distance as the independent variable for deciding appropriate intervals for sampling the steering system and for making appropriate corrections to the steering center position, those skilled in the art will further appreciate in view of this disclosure that the sampling interval could be determined as a function of the vehicle's velocity and time, or as a function of some power of the vehicle's velocity and time. This flows directly from the notion that a body moving with a velocity for some period of time will traverse a distance proportional to the velocity and to the travel time. Accordingly, the control module of the present invention could utilize travel time and velocity to synthesize a distance which may not equal the actual distance traveled by the vehicle during any particular interval of time. As an example, the sampling interval could be based upon the product of velocity raised to the 1.2 power and travel time. In this case, the control module, acting in conjunction with the vehicle's speed sensor, would function as a distance sensor.

The control module outputs commands to suspension unit operators 20. Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data are being processed. Those skilled in the art will further appreciate in view of this disclosure that a system according to the present invention could be implemented through the use of several types of microprocessor devices, the Motorola Type 6805 and Intel Corp. Type 8051 comprising two examples of such microprocessors.

Steering sensor 12 includes means for measuring the excursion angle of the steering system from a center position determined by the steering sensor in conjunction with the control module. As shown in FIGS. 4 and 5, steering sensor 12 comprises shutter wheel 28, attached to steering shaft 36, which shaft rotates in unison with the steering wheel as the steering wheel is turned by the driver of the vehicle. Shutter wheel 28 has a plurality of apertures 30, in this case 20 in number, which apertures serve to trigger the activity of spaced apart detectors A and B as the shutter wheel is rotated with the steering system of the vehicle. Detectors A and B detect movement of the shutter wheel. Because there are 20 apertures contained within shutter wheel 28, the steering sensor provides a signal 80 times during one revolution of the steering wheel and as a result each of the 80 signals or steps indicates 4.5° of rotation of the steering system.

As shown in FIG. 5, each of detectors A and B includes a light emitting diode (LED), 32, and a photo diode, 34. The combination of the LED and photo diode is used to detect movement of shutter wheel 28 and, hence, the steering system. This is possible because the photo diodes have two states—i.e., they are bistable. A conducting state occurs whenever light from the paired LED passes through an aperture 30 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 6A, clockwise rotation of shutter wheel 28 produces a waveform pattern for the detectors in which detector A undergoes its transition prior to detector B. In other words, detector A leads detector B. This results from the spacing between the detectors. On the other hand, as shown in FIG. 6B, counterclockwise rotation of the steering sensor produces a wave form pattern for the detectors in which detector A undergoes its transition after detector B and detector A thus lags detector B. The outputs of detectors A and B are fed into the control module and in this manner control module 14 is allowed to track the direction of the steering system's rotation.

FIG. 7 is a tabulation of the wave forms shown in FIGS. 6A and 6B in a digital format. In conventional fashion, the approximately 5 volts maximum output of the detectors is treated as a logical "1", while the zero output state is treated as a logical 37 0". FIG. 7 shows each of the possible logic pair states which could be output by detectors A and B. The pairs are arranged in the order in which they will be received by control module 14 for both counterclockwise and clockwise rotation. As seen in FIG. 7, counterclockwise rotation is read from the bottom of the figure to the upper part of the figure with clockwise rotation being read from the top of the tabulation to the lower part of the tabulation.

The output of detectors A and B may be further processed by control module 14 to yield a signal indicating the steering system speed or angular velocity. This operation is performed quite simply by merely tracking the number of transitions of one or both detectors during a given unit of time. The number of such transitions during the sampling period will be directly proportional to the angular speed of the steering system. Those skilled in the art will appreciate in view of this disclosure that although the steering sensor described herein operates according to digital electronics principles, the present invention could be practiced through the use of other types of steering sensors such as analog electronic or other types of steering sensors. As previously noted, FIG. 3 comprises a logic flow block diagram in accordance with an embodiment of this invention. The following terms are employed in FIG. 3:

$d_w$ = the travel distance during which the steering handwheel and steering system remain within a movable window of operation.

$d_s$ = sample distance; i.e., the distance $d_w$ must accumulate before the sample is completed. This value is maintained within a sampling distance register.

$\theta$ = difference between instantaneous steering position and adjusted or initially assumed steering position p Beginning at start block 38 of the logic flow diagram, the processor within control module 14 transfers to block 39 and an initial center position is assumed. The processor then transfers to block 40 wherein a window counter is set into operation. The window counter measures $d_w$, or the distance the vehicle has traveled while the steering system has remained within a window of operation. Having started to measure $d_w$, the processor transfers to block 42 wherein a question is asked about the location of the handwheel and steering system with respect to the window of operation. If the steering wheel is not within the window of operation, $d_w$ is reset to zero at block 44 and the center of the window of operation is reset at block 46 to be coincident with the instantaneous point of operation of the steering system. If, however, the steering wheel is within the window, at block 48 the control module determines the equality, if any, between $d_w$ and $d_s$. The reader will recall here that $d_s$ equals the sample distance, or the distance $d_w$ must have obtained for a sample to be completed. The event that $d_w$ is not equal to $d_s$, $d_w$ will be less than $d_s$ and the computer transfers at block 48 back to block 40 to continue operation of the window counter.

If at block 48 $d_w$ is equal to $d_s$, the processor transfers to block 50 wherein $\theta$, or the difference between the steering system position characteristic value and the last adjusted position is measured. The steering system position characteristic value may comprise either the instantaneous steering system position, or a distance-averaged steering system position, or it may comprise the center of the window of operation of the steering system, or some other value suggested by this disclosure. Once $\theta$ has been measured, the steering center is adjusted at block 52 by dividing measured $\theta$ by a factor greater than 1 and adjusting the center so that the newly adjusted center lies between the steering system position characteristic value and the previously adjusted center. In a preferred embodiment, $\theta$ would be divided by 2 so that the newly adjusted center will lie halfway between the instantaneous center and the previously adjusted center. Those skilled in the art will appreciate in view of this disclosure that the choice to adjust the center by moving halfway between the steering system position characteristic value and the previous adjusted center is a matter of tuning or adaptation of the present invention to a given steering system.

Once the location of the adjusted center has been determined at block 52, the algorithm continues at block 54 with a comparison of $\theta$ to a first constant, $K_1$. Thus, in block 54, if $\theta$ is less than or equal to $K_1$, the algorithm proceeds to block 56 wherein the sampling interval, $d_s$, is increased. It has been determined that normally $d_s$ should be increased by a factor greater than unity. For example $d_s$ could be doubled. Once $d_s$ is increased at block 56, the computer transfers to block 58 wherein the value of $d_s$ is compared to a second constant $K_2$. In the event that $d_s$ exceeds a predetermined distance constant represented by $K_2$, the program will take the last adjusted center position as the correct center position at block 60 and no further adjustment will be made. It should be noted in this regard that the step of fixing the center is optional; the present invention may be practiced without this step by simply allowing the main algorithm to run as long as the vehicle is in operation. Continuing once again with the main algorithm, if the sampling interval is less than time constant $K_2$, the computer will transfer to block 64 wherein the new value of $d_s$ will be entered into the main program and $d_w$ will be reset at block 44. Returning once again to block 54, in the event that $\theta$ is less than the angle constant $K_1$, the program transfers to block 62 wherein sampling time, $d_s$, is decreased. It has generally been determined that the $d_s$ should be multiplied by a factor which is less than 1. Regardless of whether $d_s$ has been increased in block 56 or decreased in block 62, the value of $d_s$, or sampling distance, may be used at block 66 to calculate and enter a new value for the size of the window of operation. Decreasing the size of the window allows a system according to the present invention to predict the true steering center with increased confidence. In a similar fashion, the increase in $d_s$ which the present system provides enhances the confidence level of the predicted center. The size of the window could be manipulated by making the window size a function of the sampling distance. For example, if the sampling distance is increased to four times the initial value, the size of the window could be reduced from the initial value of 18 degrees of rotation of shutter wheel 28 to 13.5 degrees of rotation. It should be noted, however, that use of a variable window size according to the present invention is optional.

A system according to the present invention is particularly beneficial on winding roads because the distance based sampling algorithm will enable the steering system to find the true center position much more quickly than would be the case with a time based sampling algorithm.

Once a precise steering center position has been determined and fixed in the processor's memory, knowledge of the center position can be used as follows. First, in the event that a large value of $\theta$, is sensed by steering sensor 12, such as when the motor vehicle is in a parking maneuver, the amount of power assist provided to the steering gear may be increased greatly. If, however, only a small steering angle $\theta$ is sensed, such as when the vehicle is traversing a relatively straight roadway, the amount of power assist provided to the steering gear may be reduced drastically. In the case of the adjustable suspension unit operators 20, where the steering sensor detects a suitable excursion from the adjusted center position, the suspension unit operators 20 may be directed to assume an appropriate level of damping and/or vehicle height control.

Figure 3:
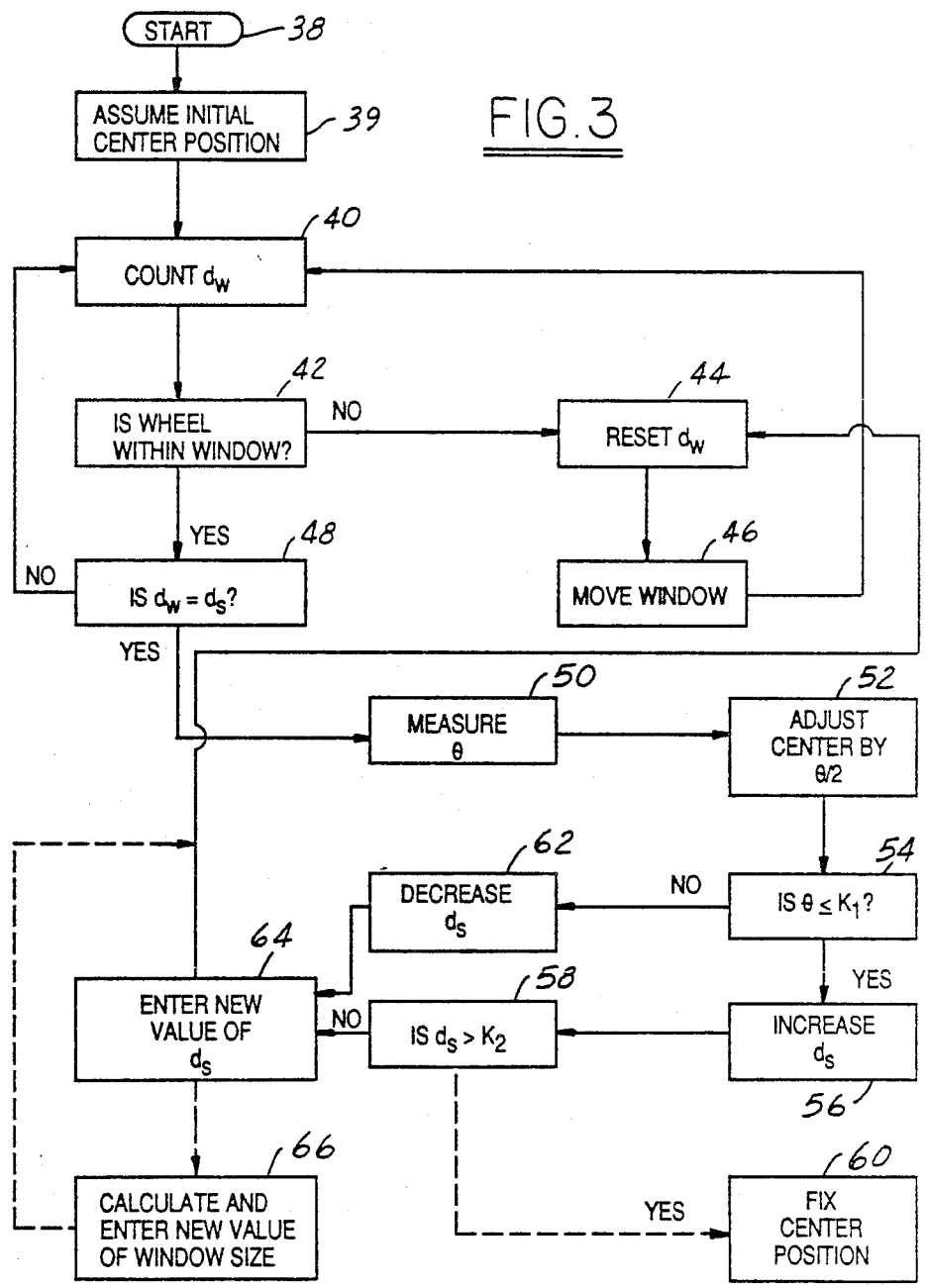
FIG. 3 contains a logic flow block diagram in accordance with an embodiment of this invention.

The present invention thus represents a method for determining the center position of a vehicular steering system according to the steps shown in FIG. 3. Blocks 39, 40 and 42 thus correspond to assuming an initial center position and recording the window distance during which the steering system has remained within the window of operation extending about the assumed center position. In block 48, the counted window distance, $d_w$, is compared to a variable sampling distance $d_s$. In block 50, the difference $\theta$ is measured between the instantaneous steering system position and the assumed center position, but only if the window distance is equal to the sample distance. In block 52, the assumed center position is adjusted according to the measure difference between the instantaneous steering position and the assumed steering position. In blocks 54, 56 and 62, the sampling distance is adjusted according to the measured difference between the instantaneous steering system position and the adjusted steering position. Continuing with other details of this system, at block 44, measured window distance is set equal to zero whenever the steering system is operated outside of the window of operation or whenever window distance is equal to sampling distance. The window of operation comprises an angular region of operation of a rotatable steering shaft with the angular region having a predetermined size which may be varied in accordance with the magnitude of sampling distance.

The hardware of the present system may be described according to its functional attributes as follows. First, steering sensor 12 and its accompanying circuitry within control module 14 comprise sensor means for defining a movable center region of operation of the steering system and for detecting the operational position of the steering system with respect to the center region. The sensor and associated circuitry also comprise means for defining a window of operation extending about the center position and having a discrete center therein. Travel distance sensor 22 comprises means for tracking the distance traveled by the vehicle. The control module includes a distance register operatively connected with the steering sensor and distance sensor for determining the distance the steering system is operated within a given window.

Various modifications and variations will no doubt occur to those skilled in the arts to which this invention pertains. For example, the particular sensors used in conjunction with the disclosed system may be varied from those herein and the system may be operated according to various control constants and changes in window size and other values for the variables contained within the calculational scheme described herein. These and all other variations which basically rely on the teachings by which this disclosure has advanced the art are properly considered within the scope of this invention as defined by the appended claims.

I claim:
1. An apparatus for determining the center position of a steering system installed in a vehicle, comprising:
    steering sensor means for defining a movable center region of operation of said steering system and for detecting the operational position of said steering system with respect to said center region;
    distance sensor means for tracking the distance traveled by said vehicle; and
    processor means operatively connected with said steering and distance sensor means for adjusting the position of said center region of operation.
2. An apparatus according to claim 1 wherein said processor means adjusts the position of said center region of operation by directing said steering sensor means to measure the difference between the position of the steering system and said center region and by moving the position of said center region by an amount which is based upon the magnitude of such difference.
3. An apparatus according to claim 2 wherein said processor means adjusts the position of said center region of operation at predetermined intervals of distance sensed by said distance sensor.
4. An apparatus according to claim 3 wherein said processor means adjusts the magnitude of said predetermined intervals of distance based upon the magnitude of said measured difference between the position of the steering system and the center region.
5. An apparatus according to claim 1 wherein said center region of operation comprises a window with a discrete center therein.
6. An apparatus according to claim 5 wherein said processor means adjusts the position of said window by directing said steering sensor means to measure the difference between the position of the steering system and said discrete center and by moving the position of said window by an amount which is based upon the magnitude of such difference.
7. An apparatus according to claim 6 wherein said processor means adjusts the position of said window whenever said steering system is operated outside of said window, such that the discrete center is made coincident with the instantaneous operating position of the steering system.
8. An apparatus according to claim 1 wherein said distance sensor comprises a vehicle velocity sensor, operatively connected with said processor, for synthesizing a distance based upon said velocity and upon a specified time interval.
9. An apparatus according to claim 1 wherein said steering sensor comprises a shutter wheel which is rotatable in unison with the steering system of said vehicle and spaced apart optical devices which detect movement of said shutter wheel.
10. An apparatus according to claim 1 wherein said distance sensor comprises a variable reluctance alternating current generator driven by the powertrain of said vehicle.
11. A method for determining the center position of a steering system installed in a vehicle, comprising the steps of:
    assuming an initial center position;
    recording the window distance during which the steering system has remained within a window of operation extending about said assumed center position;
    comparing the accumulated window distance to a variable sampling distance;

measuring the difference between a steering system position characteristic value and said assumed center position whenever said window distance bears a predetermined relationship to said sampling distance;

adjusting the assumed center position according to said measured difference between said steering system position characteristic value and said assumed center position;

adjusting said sampling distance according to said measured difference between said steering system position characteristic value and said adjusted center position; and repeating each of said steps sequentially with said adjusted center position substituted for said assumed center position.

12. A method according to claim 11 wherein the accumulated window distance is set equal to zero whenever said steering system is operated outside of said window of operation.

13. A method according to claim 11 wherein the accumulated window distance is set equal to zero whenever said accumulated window distance is equal to said sampling distance.

14. A method according to claim 11 wherein said steering system position characteristic value comprises the instantaneous steering system position.

15. A method according to claim 11 wherein said steering system position characteristic value comprises a distance-averaged function of the steering system position.

16. A method according to 11 wherein said steering system position characteristic value comprises the center of said window of operation.

17. A method according to 11 wherein said window of operation comprises an angular region of operation of a rotatable steering shaft, with said angular region having a predetermined size.

18. A method according to 17 wherein said window of operation is relocated whenever said rotatable steering shaft is operated outside of said window, so that the relocated window extends on either side of the instantaneous position of said steering shaft.

19. A method according to claim 11 wherein said window of operation comprises an angular region of operation of a rotatable steering shaft, with said angular region being of variable size.

20. A method according to claim 19 wherein the size of said window of operation bears a predetermined relationship to said sampling distance.

21. A method according to claim 20 wherein the size of said window of operation is generally decreased as said sampling distance is increased.

22. A method according to claim 11 wherein each of said steps is repeated sequentially until said sampling distance reaches a predetermined value.

23. A method according to claim 11 wherein the difference between the instantaneous steering system position and the assumed center position is measured whenever said window distance is equal to said sampling distance.

24. A method according to claim 11 wherein the sampling distance is increased when measured difference between the instantaneous steering system position and the adjusted center position is less than a predetermined value.

25. A method according to claim 11 wherein the sampling distance is decreased when the measured difference between the instantaneous steering system position and the adjusted center position is greater than a predetermined value.

26. A method for determining the center position of a steering system installed in a vehicle, comprising the steps of:

assuming a discrete center position;

defining a window extending about said discrete center position;

recording the excursion distance said steering system is operated outside said window during a predetermined vehicle travel distance; and adjusting the discrete center position according to the magnitude of said recorded excursion distance.

* * * * *